(12) United States Patent
Stottler et al.

(10) Patent No.: US 10,969,049 B1
(45) Date of Patent: Apr. 6, 2021

(54) FLUID DAMPER

(71) Applicant: Robert Bosch GmbH, Stuttgart (DE)

(72) Inventors: Shari Stottler, Honeoye Falls, NY (US); Emmanuel A. Guzman Escalante, San Luis Potosí (MX); Josué I. Chávez Mendoza, San Luis Potosí (MX); John P. Casari, Manchester, MI (US)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 16/585,601

(22) Filed: Sep. 27, 2019

(51) Int. Cl.
*F16L 55/04* (2006.01)
*F16L 55/05* (2006.01)

(52) U.S. Cl.
CPC .................. *F16L 55/05* (2013.01)

(58) Field of Classification Search
CPC .. F15L 55/05; F15L 55/041; F16J 3/02; F16D 2125/12; F16L 55/05; F16L 55/041
USPC .......................................................... 138/30
See application file for complete search history.

(56) References Cited

U.S. PATENT DOCUMENTS

| | | | |
|---|---|---|---|
| 3,628,573 A * | 12/1971 | Loliger | F16L 55/052 138/30 |
| 4,205,637 A | 6/1980 | Ito et al. | |
| 4,295,452 A | 10/1981 | Lembke et al. | |
| 4,611,795 A * | 9/1986 | Muzechuk | F16F 13/10 138/30 |
| 4,615,320 A | 10/1986 | Fehrenbach et al. | |
| 4,649,884 A | 3/1987 | Tuckey | |
| 4,729,360 A | 3/1988 | Fehrenbach et al. | |
| 5,505,181 A | 4/1996 | McRae et al. | |
| 6,230,685 B1 | 5/2001 | Kilgore et al. | |
| 6,321,719 B1 | 11/2001 | Schwegler | |
| 6,651,627 B2 | 11/2003 | Zdroik et al. | |
| 6,688,322 B2 | 2/2004 | Wynn, Jr. et al. | |
| 6,843,232 B2 | 1/2005 | Keesee et al. | |
| 6,901,913 B1 | 6/2005 | Tsuchiya et al. | |
| 6,901,964 B2 | 6/2005 | Kippe et al. | |
| 6,929,034 B1 * | 8/2005 | Larsen | F16L 27/11 138/109 |
| 7,228,846 B2 | 6/2007 | Kolgore | |
| 7,401,594 B2 | 7/2008 | Usui et al. | |
| 7,513,240 B2 | 4/2009 | Usui et al. | |

(Continued)

FOREIGN PATENT DOCUMENTS

DE            10327408 A1     4/2004
DE     102015219768 A1     4/2017

*Primary Examiner* — James F Hook
(74) *Attorney, Agent, or Firm* — Michael Best & Friedrich LLP

(57) ABSTRACT

A fluid damper includes a body defining a fluid chamber and a first opening. The body is formed by a first cover and a second cover joined along an axial direction. A damping device is suspended inside the fluid chamber to damp pressure pulsations. The damping device is constrained by a peripheral edge. The damping device divides the fluid chamber into first and second sub-chambers. The first cover has a first wall portion into which a second wall portion of the second cover is received. A hermetic seal is formed between the first and second wall portions. The second cover has a terminal edge lying within the first wall portion of the first cover, the terminal edge being segmented into a plurality of fingers that cooperate with a ledge surface of the first cover to pinch the peripheral edge of the damping device.

20 Claims, 7 Drawing Sheets

(56) References Cited

U.S. PATENT DOCUMENTS

| | | |
|---|---|---|
| 7,516,734 B2 | 4/2009 | Tominaga et al. |
| 8,366,421 B2 | 2/2013 | Munakata et al. |
| 8,397,696 B2 | 3/2013 | Hanjagi |
| 8,757,212 B2 | 6/2014 | Bartsch et al. |
| 8,876,502 B2 | 11/2014 | Usui et al. |
| 8,955,550 B2 * | 2/2015 | Oikawa .................. F02M 59/06 138/30 |
| 9,057,348 B2 | 6/2015 | Usui et al. |
| 9,243,623 B2 | 1/2016 | Lucas |
| 9,264,916 B2 | 2/2016 | Li et al. |
| 9,624,916 B2 | 4/2017 | Saito |
| D797,155 S | 9/2017 | Ostrosky et al. |
| 9,777,879 B2 | 10/2017 | Fujita et al. |
| 9,803,600 B2 | 10/2017 | Nah et al. |
| 2002/0139426 A1 | 10/2002 | Kippe et al. |
| 2003/0106535 A1 | 6/2003 | Zdroik et al. |
| 2007/0079810 A1 | 4/2007 | Usui et al. |
| 2010/0209274 A1 | 8/2010 | Oikawa et al. |
| 2016/0298581 A1 * | 10/2016 | Nah ....................... F02M 55/04 |
| 2017/0350354 A1 | 12/2017 | Ostrosky et al. |
| 2018/0216590 A1 | 8/2018 | Hwang |
| 2018/0328322 A1 | 11/2018 | Kashiwagi et al. |
| 2018/0328328 A1 | 11/2018 | Kashiwagi |
| 2019/0024646 A1 | 1/2019 | Kurt et al. |
| 2019/0048837 A1 | 2/2019 | Mikhaylov et al. |
| 2019/0063388 A1 | 2/2019 | Kurt |

* cited by examiner

US 10,969,049 B1

FLUID DAMPER

BACKGROUND

The present invention relates to fluid dampers, for example used in a fuel injection system, or pressurized lubrication system, among other applications.

SUMMARY

In one aspect, the invention provides a fluid damper including a body defining a fluid chamber and a first opening configured to receive pressurized fluid into the fluid chamber. The body is formed by a first cover and a second cover joined along an axial direction. A damping device is suspended inside the fluid chamber and configured to damp fluid pressure pulsations. The damping device is constrained by a peripheral edge thereof to the body. The damping device divides the fluid chamber into first and second sub-chambers. The first cover has a first wall portion into which a second wall portion of the second cover is received, and a hermetic seal is formed between the first and second wall portions of the first and second covers. The second cover has a terminal edge lying within the first wall portion of the first cover, the terminal edge being segmented into a plurality of fingers that cooperate with a ledge surface of the first cover to pinch the peripheral edge of the damping device.

In another aspect, the invention provides a fluid damper including a body defining a fluid chamber and a first opening configured to receive pressurized fluid into the fluid chamber. The body is formed by a first cover and a second cover, each having a sheet construction. A damping device including at least one membrane is suspended inside the fluid chamber, the damping device being constrained by a peripheral edge thereof to the body. The damping device divides the fluid chamber into first and second sub-chambers. The first cover has an outer wall into which an outer wall of the second cover is received, a hermetic seal being formed between the first and second covers. The outer wall of the second cover terminates in a plurality of inward-extending fingers that are elastically deflected to exert a constraining force that pinches the peripheral edge of the damping device against the first cover.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
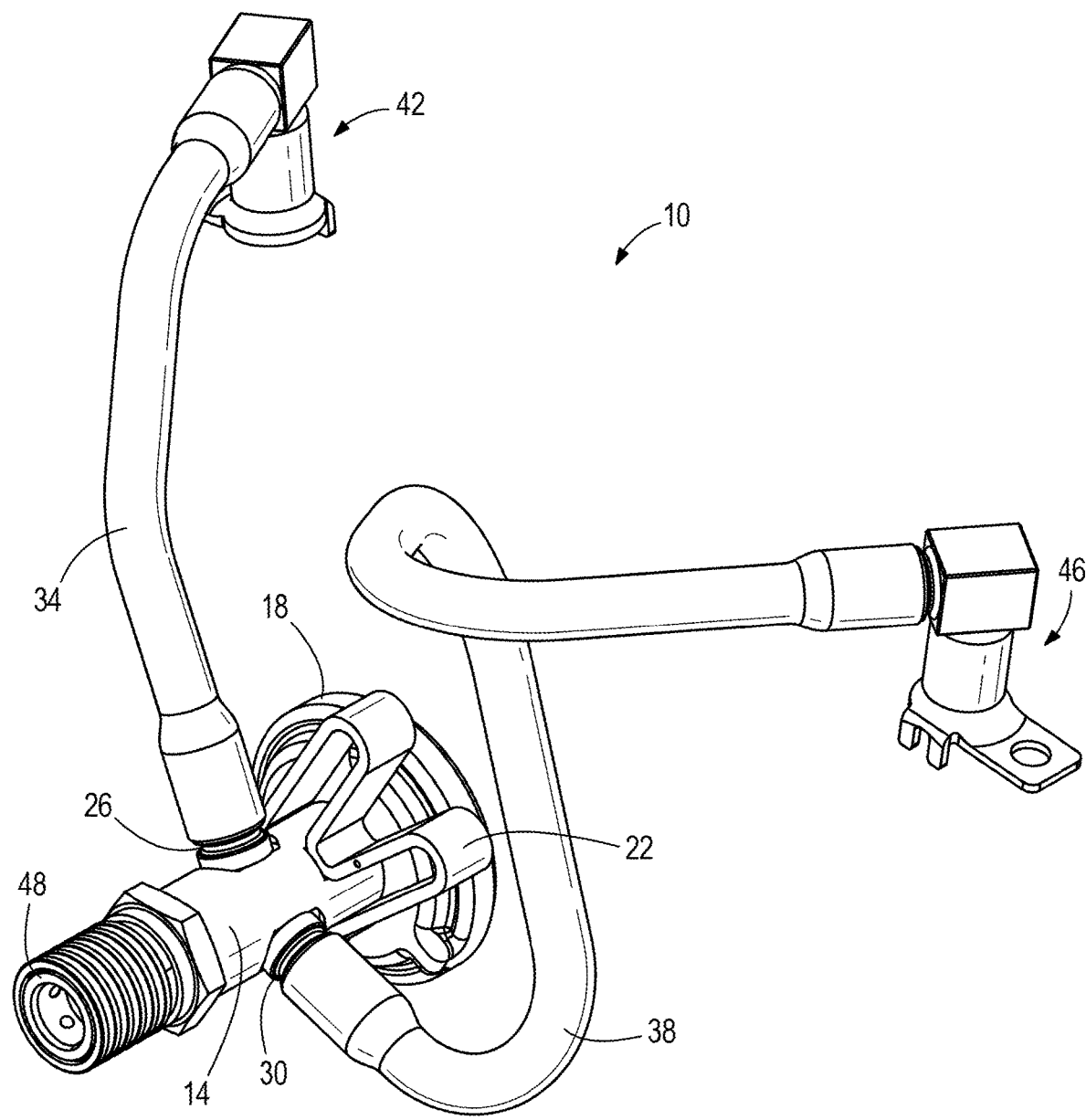
FIG. 1 is a perspective view of a portion of a fuel injection system including a fuel manifold and a damper for damping fuel pressure pulsations.
Figure 2:
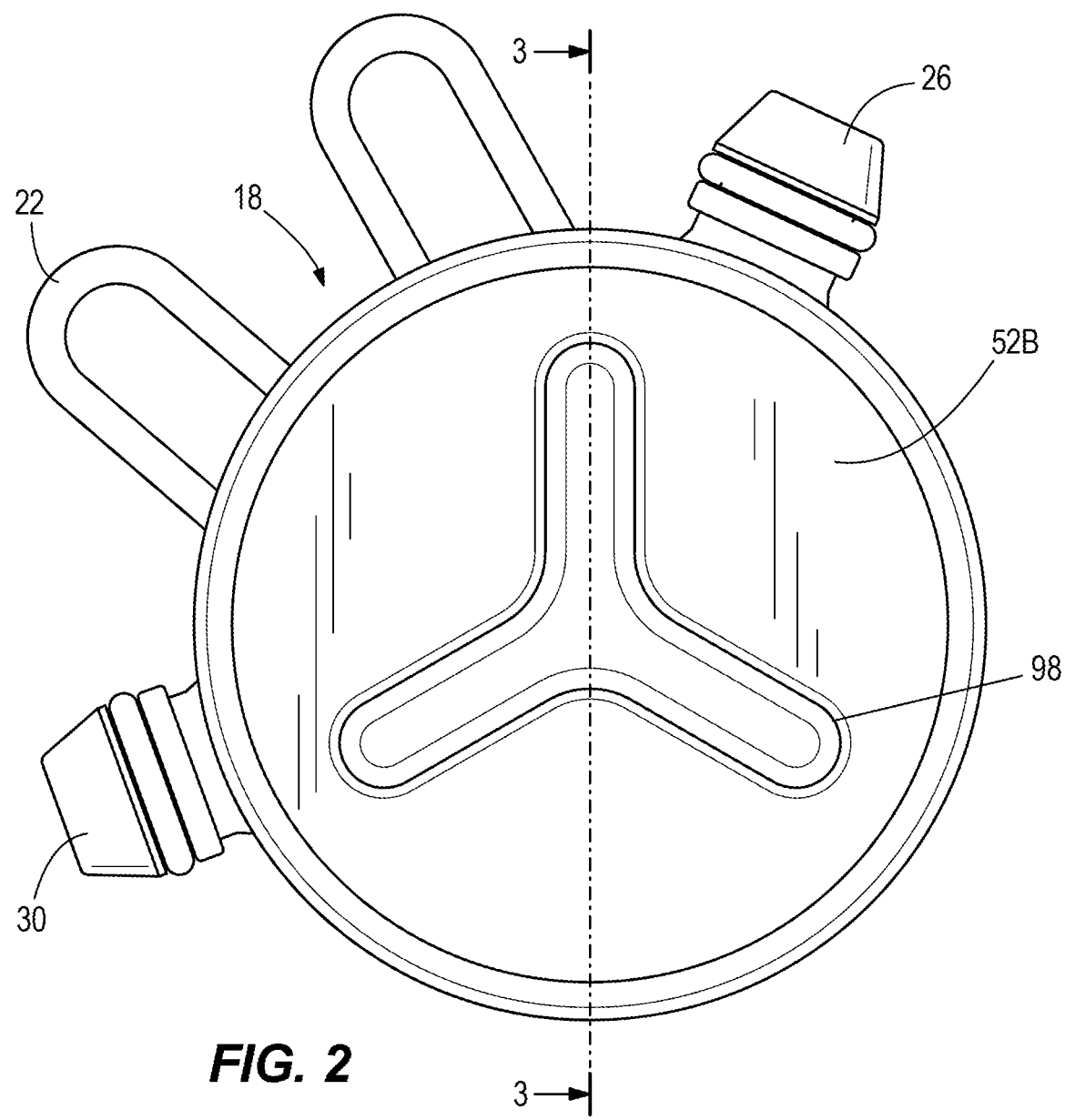
FIG. 2 is an end view of the manifold and the damper.

FIG. 1 illustrates a fuel system 10 that can be used to provide fuel to an internal combustion engine. The fuel system 10 includes a manifold 14 for receiving and distributing fuel from a fuel supply. A damper 18 communicates with the manifold 14 to damp pressure pulsations in the fuel, e.g., introduced from one or more fuel pumps and/or the opening and closing of fuel injection valves (not shown). In some constructions, the fuel system 10 can include a high-pressure fuel rail containing fuel pressurized to 200-350 bar, e.g., by a high-pressure fuel pump (HPFP) that receives fuel from a fuel tank via a primary or low-pressure fuel pump. However, in other constructions, there is only the manifold 14 and no separate fuel rail. The fuel pressure in a system without a fuel rail or HPFP may be 3-7 bar. A mounting bracket 22 is coupled with the manifold 14 for securing the manifold 14 to a support surface. The manifold 14 includes two outlet ports 26, 30. In other embodiments, more outlet ports may be present. Hoses 34, 38 are coupled to the respective outlet ports 26, 30 to transfer fuel from the manifold 14 to respective injector mounting structures 42, 46, for example each including a barb block with a hose barb and an injector cup for receiving an upstream end of an electrically-operated injection valve or "injector." An adapter 48, for example a threaded adapter or other form of connector, is provided on the manifold 14, opposite the damper 18 as illustrated, for fluid and mechanical connection with another fuel supply structure.

Figure 3:
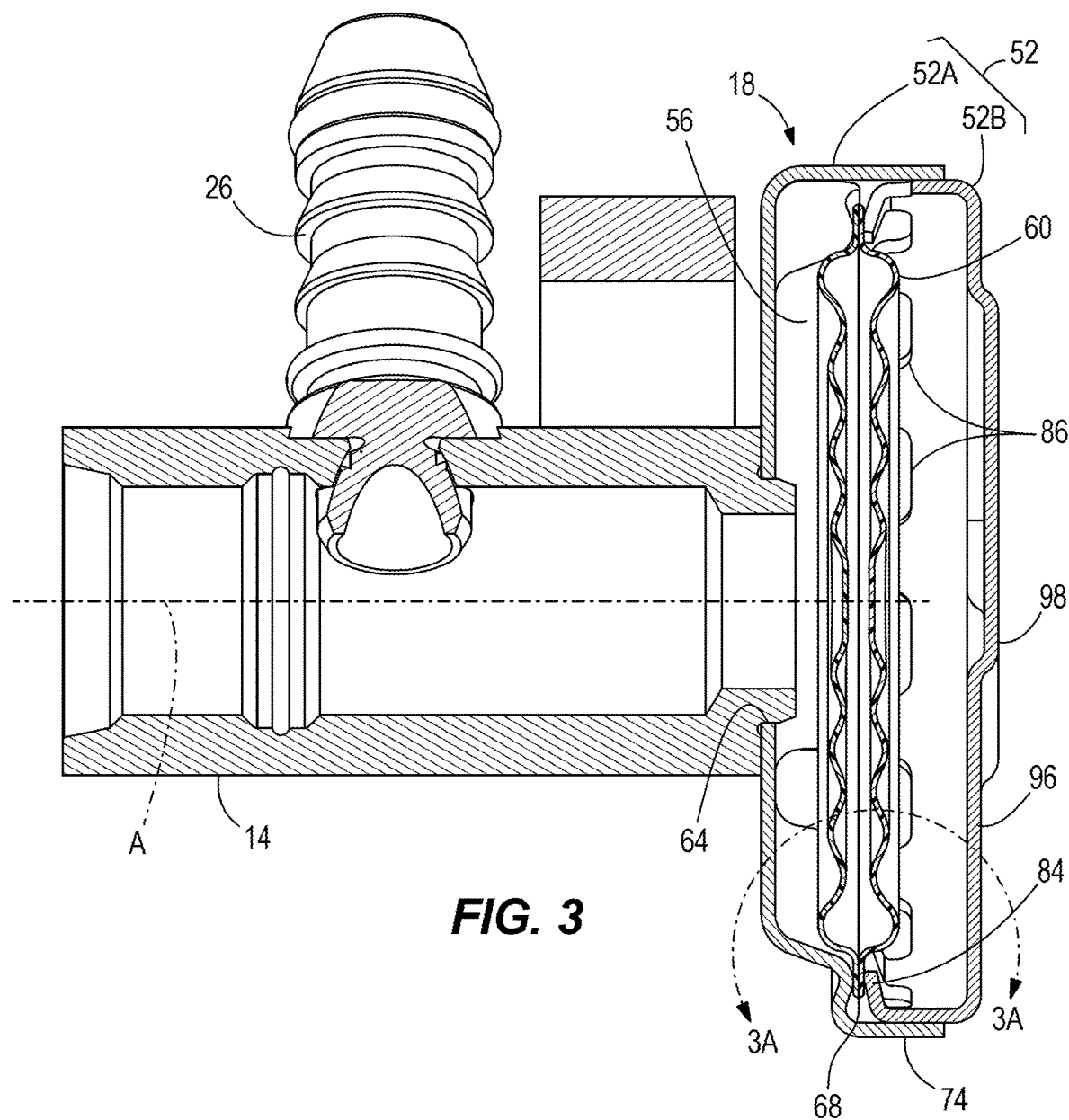
FIG. 3 is a cross-section view of the manifold and damper taken along line 3-3 of FIG. 2.
Figure 3A:
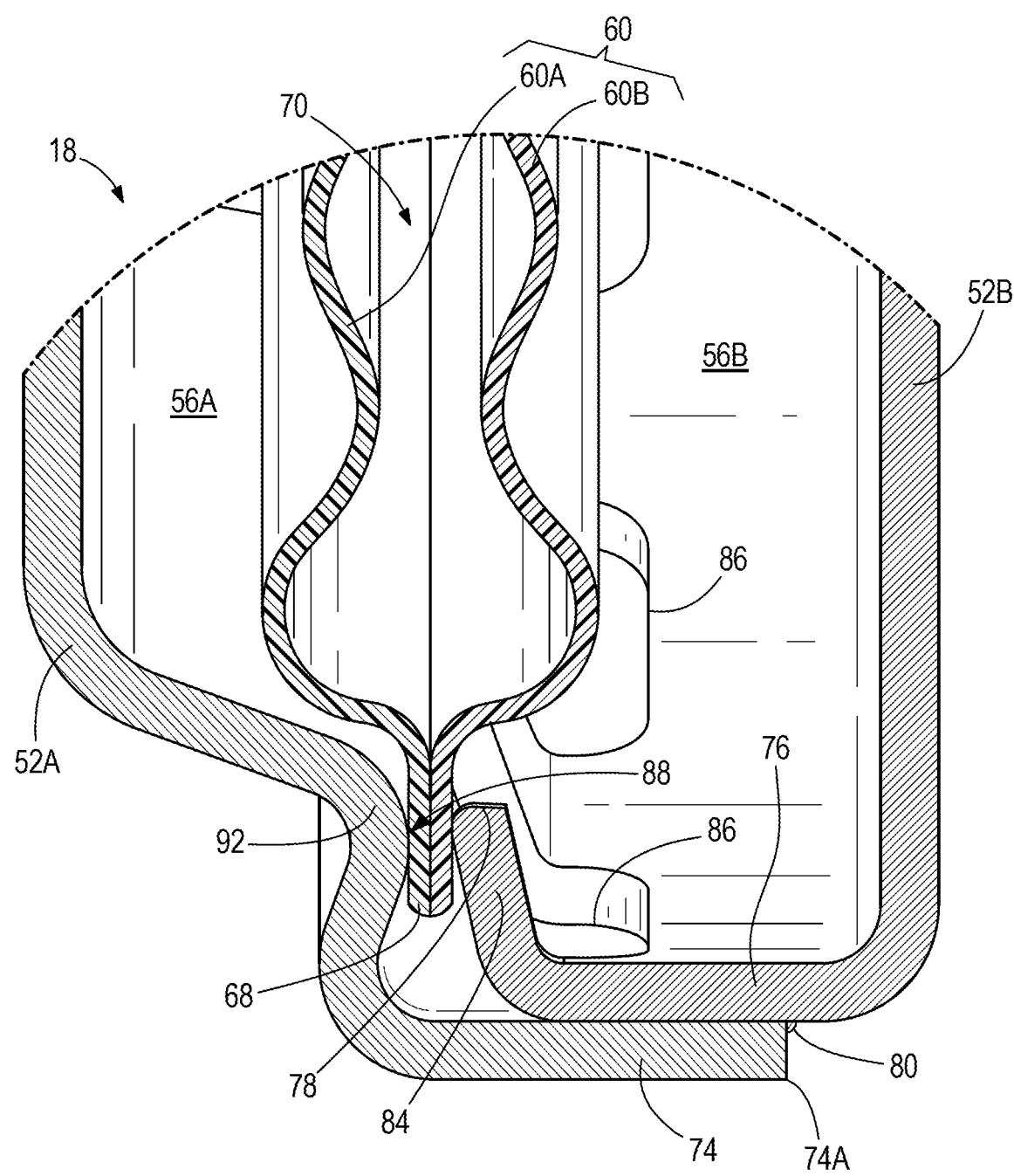
FIG. 3A is a detail view of an edge portion of the damper shown in FIG. 3.

Referring particularly to FIGS. 3 and 3A, the damper 18 is an assembly formed from a select few parts, including a two-piece body 52 (first cover 52A and second cover 52B) defining a fluid chamber 56, and a damping device 60 positioned inside the fluid chamber 56. As illustrated, the body 52 is cylindrical, as is the fluid chamber 56 defined therein. The body 52 includes an opening 64 configured to receive pressurized fluid, in one example liquid such as gasoline or diesel fuel, among others, into the fluid chamber 56. As shown and as described in further detail below, the first cover 52A and the second cover 52B are joined along an axial direction defined by a central axis A. The damping device 60 is a flexible damping device suspended inside the fluid chamber 56 and configured to damp (i.e., suppress, attenuate, diminish, etc.) fluid pressure pulsations. The illustrated embodiment shows one particular configuration of the damping device 60, although those of skill in the art will appreciate that the damping device 60 can take various forms. As illustrated, the damping device 60 is formed of first and second diaphragms or membranes 60A, 60B joined along peripheral edges thereof to define a peripheral edge 68 of the damping device 60. Although the membranes 60A, 60B can be of metal (e.g., stainless steel) construction, they are thinner than the material of the covers 52A, 52B and may be configured for elastic deflection under the system's operating conditions. The damping device 60 (e.g., each membrane 60A, 60B) is shaped with a series of convolutions concentric about the central axis A. A gas-containing chamber 70 is defined inside the damping device 60 between the first and second membranes 60A, 60B. The damping device 60, along with the body 52, may be constructed of stainless steel in some constructions. The damping device 60 is constrained by the peripheral edge 68 thereof to the body 52. Further, the damping device 60 divides the fluid chamber 56 into first and second sub-chambers 56A, 56B. The membrane(s) 60A, 60B may flex and/or the gas within the chamber 70 may compress during operation in response to pressure pulsations incident within the surrounding liquid medium, which is fuel in the construction of the fuel system 10. However, dissipation or damping of the pressure pulsations may occur primarily in the fluid of the sub-chambers 56A, 56B or areas leading to them. The fluid is exchanged in and out of the chamber 56, and in between the sub-chambers 56A, 56B during operation of the system as fluid moves around the peripheral edge 68 of the damping device 60. In some constructions, there may be turbulent flow between the sub-chambers 56A, 56B, resulting in eddy formation. In other constructions, the flow between sub-chambers 56A, 56B is laminar.

Each of the first and second covers 52A, 52B has a sheet construction. The first cover 52A has a wall portion 74 into which a wall portion 76 of the second cover 52B is received. Both wall portions 74, 76 extend parallel to the central axis A. Both wall portions 74, 76 are outer walls of their respective covers 52A, 52B with respect to the central axis A. In the illustrated constructions, both wall portions 74, 76 are cylindrical walls. However, the wall portions 74, 76 may be other shapes such as elliptical or polygonal in other constructions as long as the two are matched in size and shape to join tightly together. A hermetic seal 80 is formed between the respective wall portions 74, 76 of the first and second covers 52A, 52B along an entire peripheral or circumferential joint formed therebetween. The hermetic seal 80 is formed by a weld seam extending along a terminal or distal edge 74A of the wall portion 74 of the first cover 52A. The covers 52A, 52B can be welded by laser welding, MIG welding, TIG welding, or alternately bonded with adhesive (e.g., glue, epoxy).

The second cover 52B has a terminal or distal edge 78 lying within the wall portion 74 of the first cover 52A. The terminal edge 78 of the second cover 52B is segmented into a plurality of fingers 84, which can be evenly distributed or provided in another alternate array or pattern. The fingers 84 extend inward from the wall portion 76. The fingers 84 are separated by a corresponding plurality of notches 86. The notches 86 establish fluid communication passages between the first and second sub-chambers 56A, 56B, around the peripheral edge 68 of the damping device 60—at least at certain peripheral locations such as at the top of FIG. 3. The fingers 84 cooperate with a ledge surface 88 of the first cover 52A to pinch the peripheral edge 68 of the damping device 60 to retain its position. In particular, the ledge surface 88 is located to extend along a common radial position with the fingers 84. FIG. 3A illustrates the finger 84 in an interference position that represents the natural (non-deflected) state or shape, prior to deflection during assembly of the damper 18. Upon assembly, the fingers 84 can be under elastic deflection to exert a constraining force on the peripheral edge 68 of the damping device 60.

Figure 6:
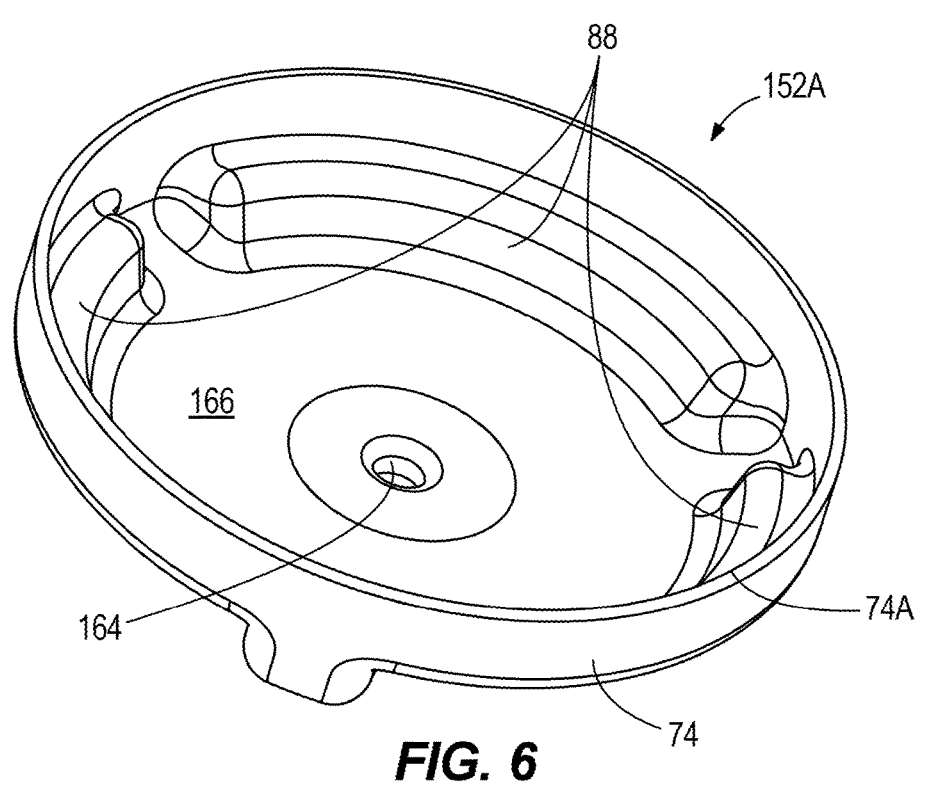
FIG. 6 is a perspective view illustrating the inside of a first cover of the damper of FIG. 5.

The ledge surface 88 of the first cover 52A can be discontinuous, a particular configuration of which is shown in the alternate embodiment of FIG. 6. As shown in FIG. 3A, the ledge surface 88 can be formed into a raised offset position with respect to the adjacent wall of the first cover 52A by deformations 92 (e.g., pressed or embossed concavities) in the exterior side of the first cover 52A. In some constructions, the ledge surface 88 and the fingers 84 can be reversed such that the first cover 52A (having the fingers) fits into the second cover 52B (having the ledge surface). According to the disclosed construction, the damping device 60 is held directly by the two covers 52A, 52B forming the damper body 52 (e.g., exclusively between the ledge surface 88 of the first cover 52A and the fingers 84 of the second cover 52B), without any additional retainers, fasteners, clips, etc. Thus, it is not possible to introduce an error of manufacture by misassembling or omitting a component necessary for damping device retention. Although the damper 18 is constructed without any separate, dedicated components for restraint of the damping device 60, there remains a functional separation between the body joining function (hermetic seal 80 formed by weld seam) and the damping device clamping function (fingers 84 and ledge surface 88). In other words, these functions remain decoupled.

Segmenting the spring features provided by the fingers 84 assists self-alignment of the covers 52A, 52B during assembly, and the process for pressing the body 52 together can be repeatable and precise. Further, segmentation of the holding forces through the fingers 84 creates a more robust amount of holding force through increased degrees of freedom allowed to the spring feature. The spacing of the fingers 84 and rigidity of the damping device 60 spreads the loading force effectively constraining the damping device 60 in position. Also the heat transfer from the sealing welding to the damping device 60 is limited to the contact area of the fingers 84. This protects the damping device 60 from exposure to damaging amounts of heat that could temper the material and affect the performance.

Figure 4:
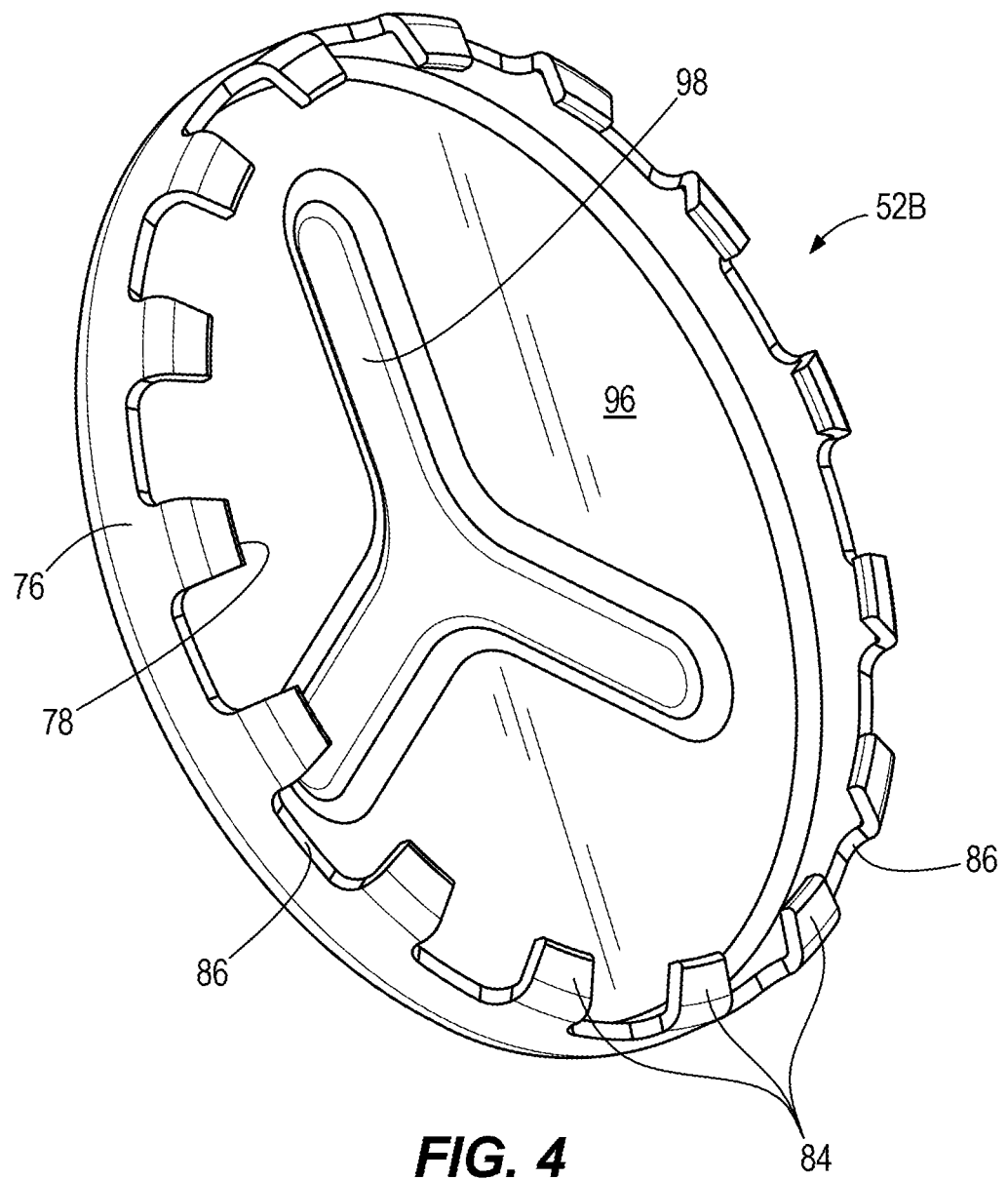
FIG. 4 is a perspective view of a back cover of the damper shown in FIGS. 1-3.

In the illustrated construction, the second cover 52B defines a solid end wall 96 (FIG. 4) with no openings such that the second sub-chamber 56B is a dead-end chamber that only communicates with the rest of the fuel in the system via the first sub-chamber 56A. The end wall 96 extends transverse to the central axis A. An interior surface of the end wall 96 includes at least one concavity 98. The at least one concavity 98 adds structural stiffness or rigidity to the end wall 96, and is also configured to extend the fluid volume of the second sub-chamber 56B. As illustrated, the concavity 98 is formed in a "Y" shape or three-pointed star, but other shapes are optional. The concavity(ies) 98 may be configured to extend the fluid volume of the second sub-chamber 56B by at least 10 percent compared to an otherwise identical second cover 52 without the concavity(ies) 98.

Figure 5:
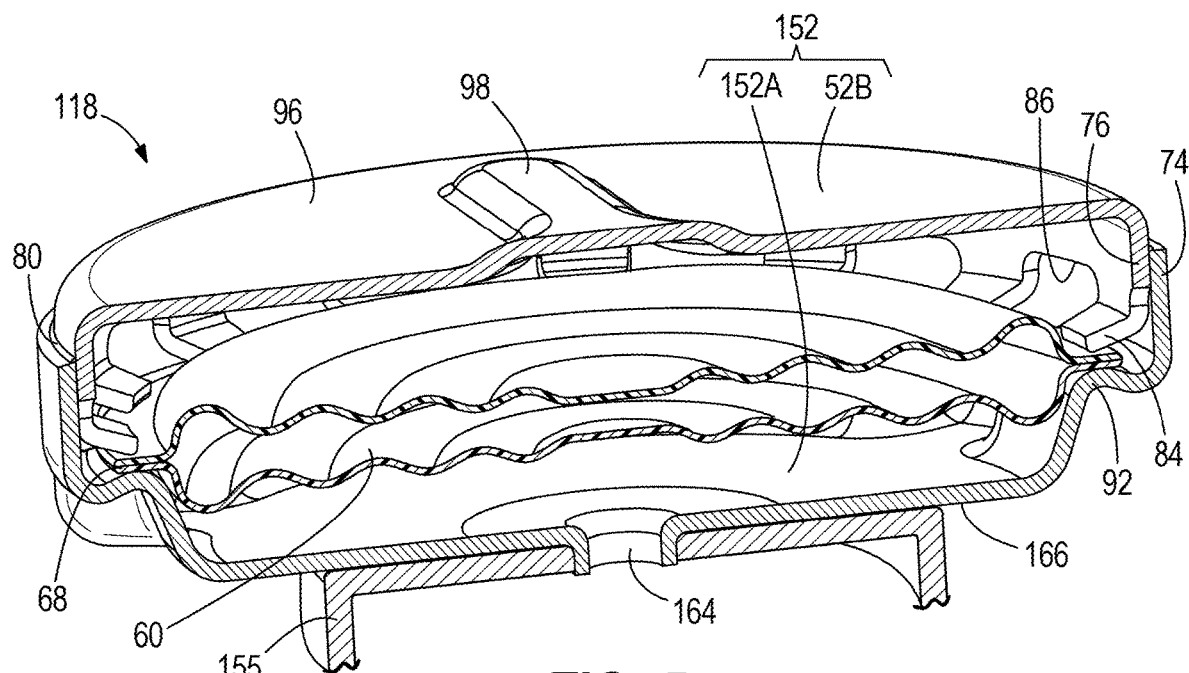
FIG. 5 is a cross-section view of a damper according to a second construction of the present disclosure.

The damper 18, for example as part of the fuel system 10, may be used in a variety of applications, including but not limited to engines for on and off-road vehicles. However, the damper 18 may find further use not limited to fuel systems, where other fluids operate within a system subject to pressure spikes of fluctuations (often where pumped to high pressures). For example, the damper 18 can be coupled to an oil supply system that lubricates moving parts (e.g., within an internal combustion engine), or within a liquid cooling system having a coolant circuit. Further, when used in a fuel system, the construction is not limited to that of FIG. 1, nor is the attachment of the damper 18 to the fuel system so limited. FIGS. 5 and 6 illustrate a modified damper 118 that is similar in most respects to the damper 18 of the preceding disclosure. Like reference numbers are used where appropriate and an extended discussion of similar features is not repeated herein. Rather, reference is made to the above description of FIGS. 1-4. The damper 118 includes a body 152 formed by first and second covers 152A, 52B. The second cover 52B may be similar or identical to the cover 52B of the damper 18, including the array of fingers 84. However, the first cover 152A is modified with an alternate opening 164 in an end wall 166 thereof. The opening 164 is smaller than the opening 64 of the first cover 52A. Furthermore, the opening 164 is formed in a stub or stem that projects axially outward from the fluid chamber 56 for insertion into an adjoining component or vessel (e.g., fuel rail 155). This is merely one example of adaptation of the damper 18 to a particular application or surrounding system.

Figure 7:
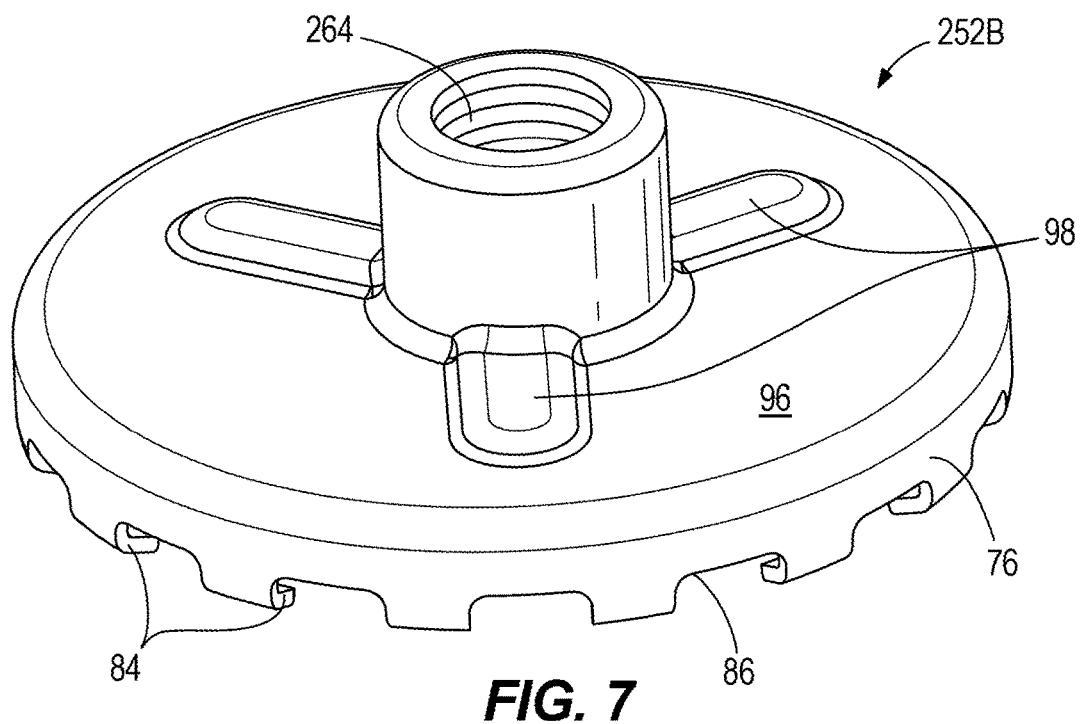
FIG. 7 is a perspective view of a second cover of a damper according to a third construction of the present disclosure.
Figure 8:
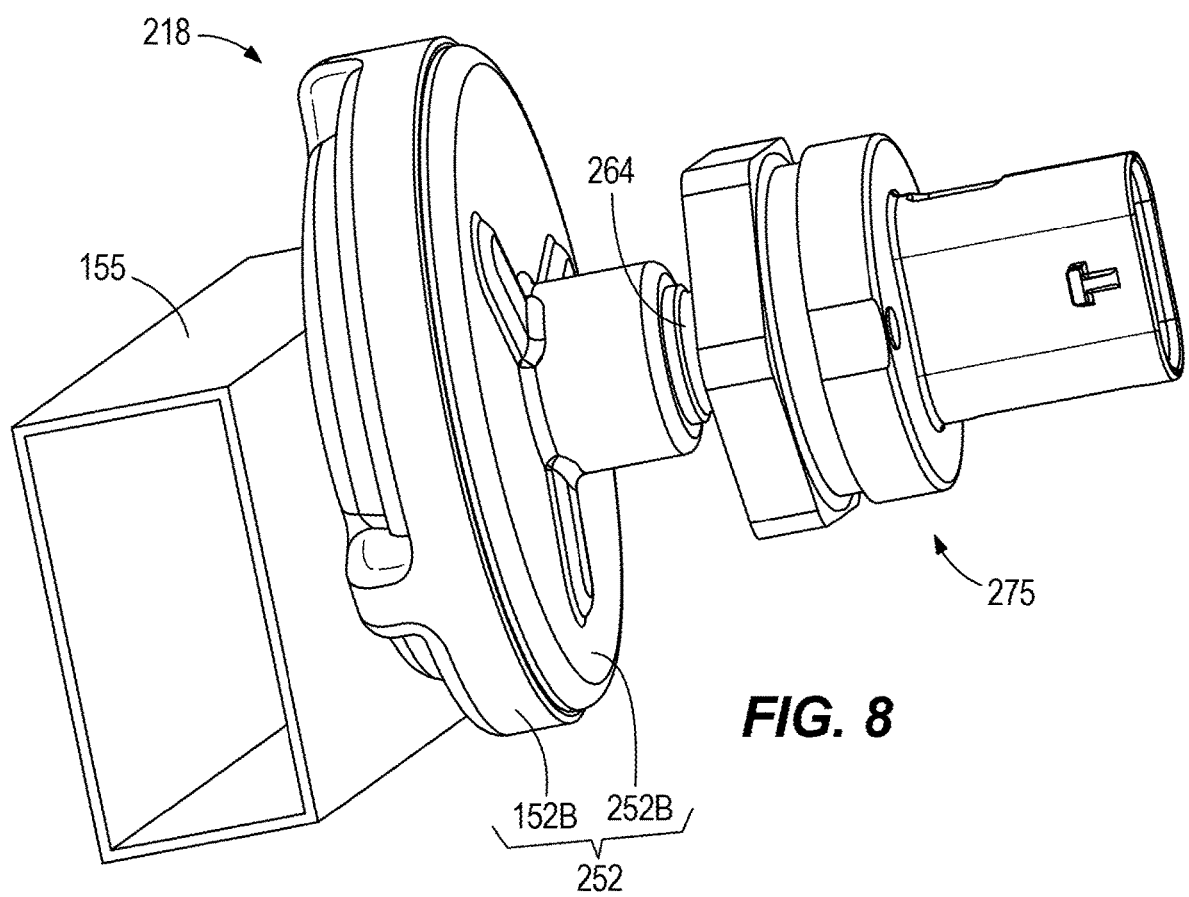
FIG. 8 is a perspective view of a damper having the second cover of FIG. 7 coupled with a pressure sensor. An opposite end of the damper body is coupled to a fuel rail.

FIGS. 7 and 8 illustrate yet another damper 218, again similar to the dampers 18, 118, such that similar reference numbers are used and a repeat discussion of similar features is not provided. The damper 218 includes a second cover 252B that, in addition to the opening 164 in the first cover 152A, includes a second opening 264. The second opening 264 can be constructed as an internally threaded boss, among other constructions, and may form an adapter for attachment of a system component such as a pressure sensor 275. The pressure sensor 275 may be of a known construction including a sensing element that converts pressure into an electrical signal, e.g., voltage that changes in correspondence to pressure change.

Various aspects of the invention are set forth in the following claims.

What is claimed is:

1. A fluid damper comprising:
   a body defining a fluid chamber and a first opening configured to receive pressurized fluid into the fluid chamber, wherein the body is formed by a first cover and a second cover joined along an axial direction; and
   a damping device suspended inside the fluid chamber and configured to damp fluid pressure pulsations, the damping device being constrained by a peripheral edge thereof to the body, wherein the damping device divides the fluid chamber into first and second sub-chambers,
   wherein the first cover has a first wall portion into which a second wall portion of the second cover is received, a hermetic seal being formed between the first and second wall portions of the first and second covers,
   wherein the second cover has a terminal edge lying to the inside of the first wall portion of the first cover, the terminal edge being segmented into a plurality of fingers that cooperate with a ledge surface of the first cover to pinch the peripheral edge of the damping device, and
   wherein the second cover is provided as a continuous material sheet to include:
      an end wall axially spaced from the damping device by the second sub-chamber,
      the second wall portion, which extends from a radially outer part of the end wall and along an interior side of the first wall portion of the first cover, and
      the plurality of fingers, each of which extends inward from the second wall portion.

2. The fluid damper of claim 1, wherein the plurality of fingers are separated by a corresponding plurality of notches in the terminal edge, the plurality of notches establishing fluid communication passages between the first and second sub-chambers, around the peripheral edge of the damping device.

3. The fluid damper of claim 1, wherein the end wall of the second cover defines a solid end wall with no openings such that the second sub-chamber is a dead-end chamber.

4. The fluid damper of claim 1, wherein the plurality of fingers are evenly distributed around an entire periphery of the second cover.

5. The fluid damper of claim 1, wherein the plurality of fingers are under elastic deflection to exert a constraining force on the peripheral edge of the damping device.

6. The fluid damper of claim 1, wherein the body is cylindrical in shape.

7. The fluid damper of claim 1, wherein the hermetic seal is formed by a weld seam extending along a terminal edge of the first wall portion of the first cover.

8. The fluid damper of claim 1, wherein the damping device is formed of first and second membranes joined along the peripheral edge, a gas-containing chamber being defined between the first and second membranes.

9. The fluid damper of claim 1, wherein the damping device is shaped with a series of convolutions concentric about a central axis thereof.

10. The fluid damper of claim 1, wherein the end wall of the second cover extends transverse to the axial direction, and wherein an interior surface of the end wall includes at least one concavity configured to extend the fluid volume of the second sub-chamber.

11. A fluid damper comprising:
    body defining a fluid chamber and a first opening configured to receive pressurized fluid into the fluid chamber, wherein the body is formed by a first cover and a second cover, each having a sheet construction; and
    a damping device including at least one membrane suspended inside the fluid chamber, the damping device being constrained by a peripheral edge thereof to the body, wherein the damping device divides the fluid chamber into first and second sub-chambers,
    wherein the first cover has an outer wall into which an outer wall of the second cover is received, a hermetic seal being formed between the first and second covers,
    wherein the outer wall of the second cover terminates in a plurality of inward-extending fingers that are elastically deflected to exert a constraining force that pinches the peripheral edge of the damping device against the first cover, and
    wherein the second cover is provided as a continuous material sheet to include:
       an end wall spaced from the damping device by the second sub-chamber,
       the outer wall, which extends from a peripheral part of the end wall and along an interior side of the outer wall of the first cover, and
       the plurality of fingers, each of which extends inward from the outer wall of the second cover.

12. The fluid damper of claim 11, wherein the plurality of fingers are separated by a corresponding plurality of notches, the plurality of notches establishing fluid communication passages between the first and second sub-chambers, around the peripheral edge of the damping device.

13. The fluid damper of claim 11, wherein the end wall of the second cover defines a solid end wall with no openings such that the second sub-chamber is a dead-end chamber.

14. The fluid damper of claim 11, wherein the plurality of fingers are evenly distributed around an entire periphery of the second cover.

15. The fluid damper of claim 11, wherein the body is cylindrical in shape.

16. The fluid damper of claim 11, wherein the hermetic seal is formed by a weld seam extending along a terminal edge of the first cover.

17. The fluid damper of claim 11, wherein the damping device is formed of first and second membranes joined along the peripheral edge, a gas-containing chamber being defined between the first and second membranes.

18. The fluid damper of claim 11, wherein the damping device is shaped with a series of convolutions concentric about a central axis thereof.

19. The fluid damper of claim 11, wherein the end wall of the second cover extends transverse to the outer wall thereof, and wherein an interior surface of the end wall includes at least one concavity configured to extend the fluid volume of the second sub-chamber.

20. The fluid damper of claim 11, wherein the first cover, the second cover, and the damping device are all constructed of stainless steel.

\* \* \* \* \*